United States Patent [19]

Holmes, Jr.

[11] Patent Number: 5,089,816
[45] Date of Patent: Feb. 18, 1992

[54] CHART INSTRUMENT FOR DISPLAYING REAL TIME VEHICLE POSITION RELATIVE TO INFORMATION ON CHARTS

[76] Inventor: Lawrence Holmes, Jr., 414 Prospect St., Midland Park, N.J. 07432

[21] Appl. No.: 421,972

[22] Filed: Oct. 16, 1989

[51] Int. Cl.⁵ ............................................ G08G 1/123
[52] U.S. Cl. ................................... 340/995; 340/971; 364/449
[58] Field of Search ............... 340/971, 988, 990, 995, 340/784; 364/443, 449; 342/452; 350/345

[56] References Cited

U.S. PATENT DOCUMENTS

| | | | |
|---|---|---|---|
| 3,483,506 | 12/1969 | Frisch | 340/995 |
| 4,053,893 | 10/1977 | Boyer | 340/995 |
| 4,393,448 | 7/1983 | Dunn et al. | 364/449 |
| 4,409,583 | 10/1983 | Dahan et al. | 340/995 |
| 4,417,309 | 11/1983 | Harvey | 340/995 |
| 4,504,910 | 3/1985 | Araki et al. | 340/995 |
| 4,567,481 | 1/1986 | Meier et al. | 340/784 |
| 4,796,190 | 1/1989 | Cummings | 364/449 |
| 4,843,381 | 6/1989 | Baron | 340/784 |
| 4,862,374 | 8/1989 | Ziemann | 364/449 |
| 4,893,247 | 1/1990 | Waudoit | 340/995 |

Primary Examiner—Jin F. Ng
Assistant Examiner—Brent A. Swarthart
Attorney, Agent, or Firm—Joseph L. Strabala

[57] ABSTRACT

A lap top navigation instrument, suitable for aircraft, includes a chart compartment covered by a transparent window containing a liquid crystal display as part of the window through which a conventional map or chart in the compartment can be viewed and a computer whereby an image can be generated in the display above the chart in the compartment and, through inputs to the computer from the aircraft's instruments, the computer generated image in the display will be continuously repositioned above the surface of the chart so as pilot using the device has a continuous visual indication of the position of his aircraft over the topography depicted on the chart in the compartment. Directional components may be added to the image giving the pilot additional information in reference to the heading of the aircraft relative to the chart's display of "North" showing how the image is actually tracking over the chart in the compartment. Further, in this device, the chart in the compartment is always visible to the pilot though the window. Should the instrument fail a pilot continues to have access to all the flight information contained on the chart without interruption. As a result, the instrument is very useful for instrument flight rules [IFR] procedures and instrument approaches for landings in that it is failsafe.

23 Claims, 4 Drawing Sheets

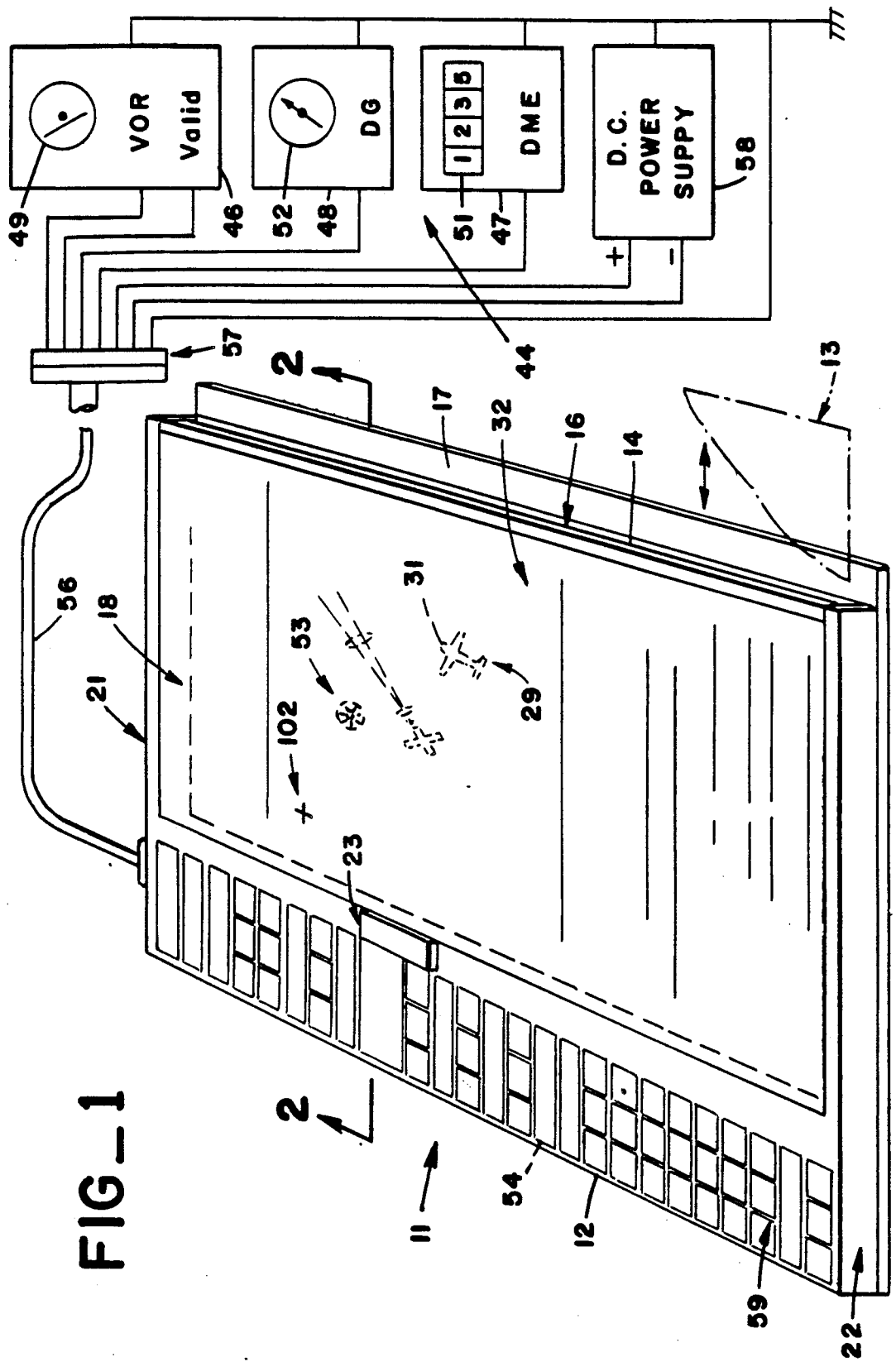

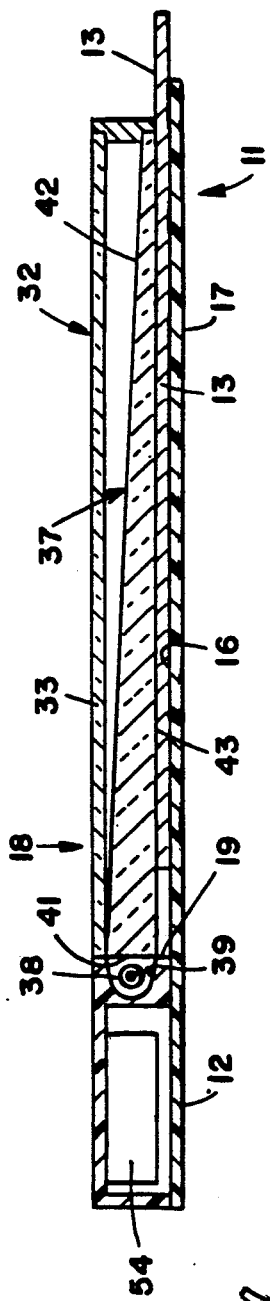
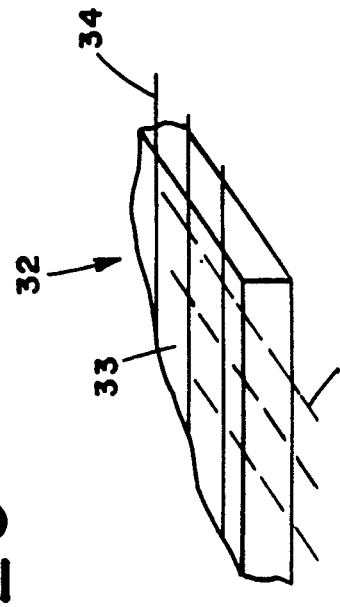
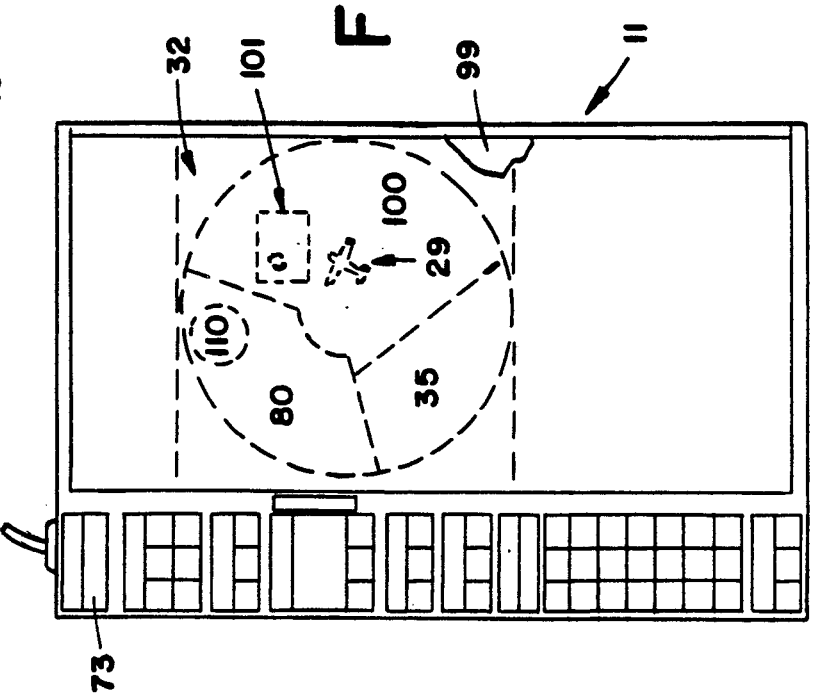

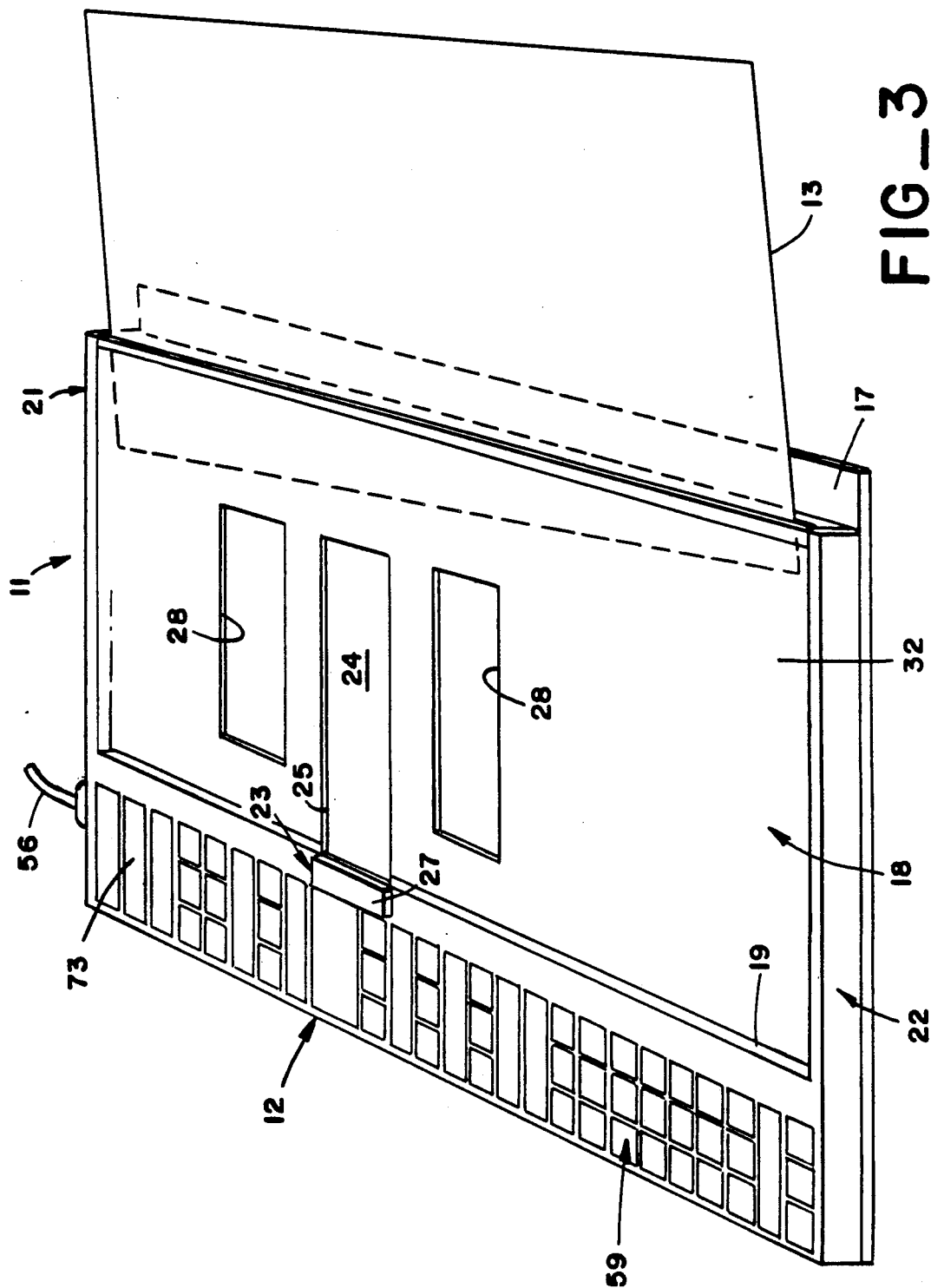

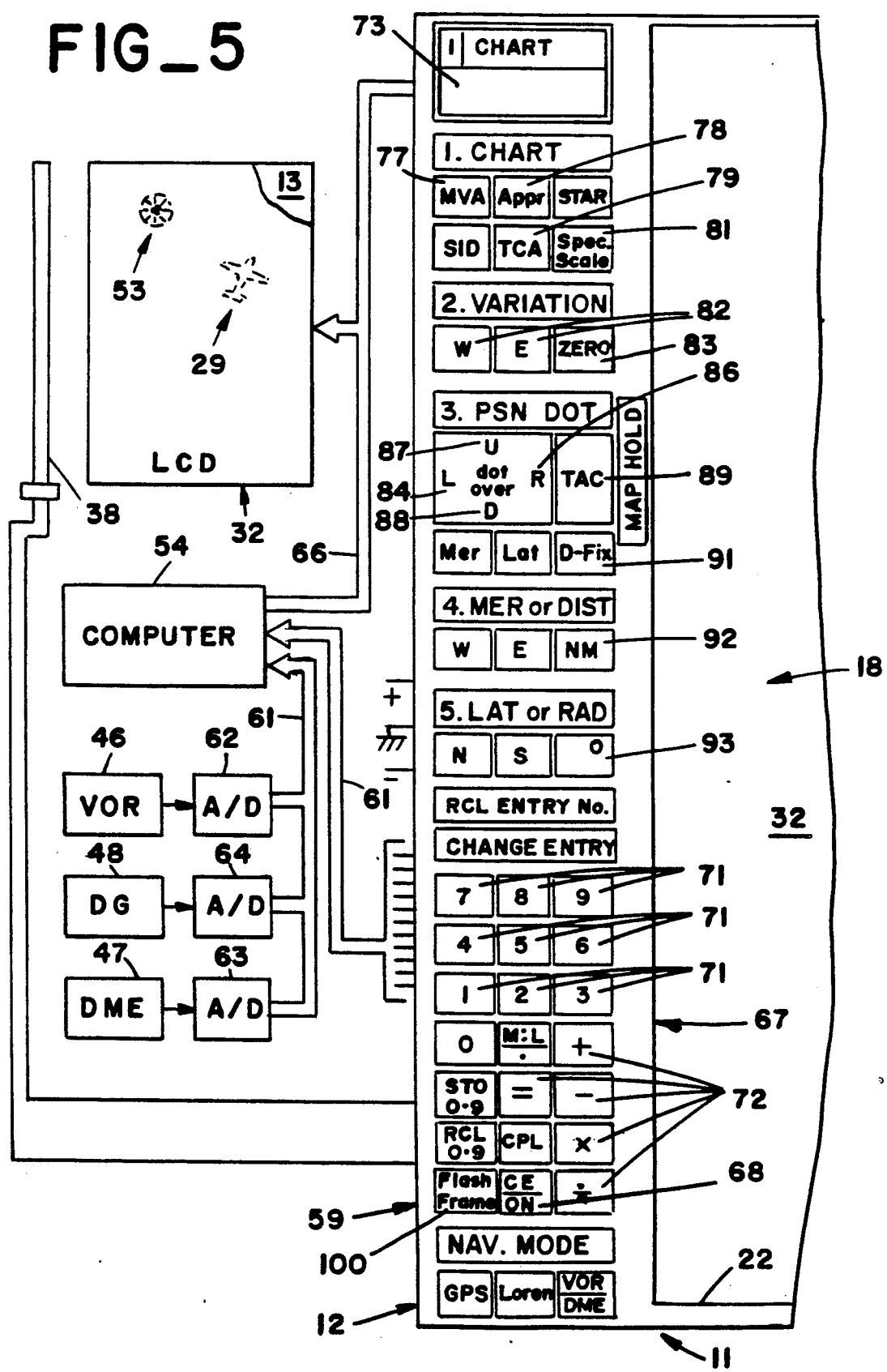
FIG_5

CHART INSTRUMENT FOR DISPLAYING REAL TIME VEHICLE POSITION RELATIVE TO INFORMATION ON CHARTS

TECHNICAL FIELD

This invention relates to a navigation visual display and in particular to an instrument for displaying the location and direction of an aircraft in reference to a conventional chart or chart placed in the instrument. Typically the chart will be a Jeppesen approach chart having a variety of flight information thereon, such as radio frequencies, radio fixes, latitude/longitude coordinates, topography of the area covered by the chart, airport runways, etc. However, the invention is not restricted to aircraft.

BACKGROUND OF THE INVENTION

Conventional aircraft instruments used in aerial navigation present data, such as compass bearings and headings, distances, times, etc., in the form of gauges, and numerical readouts. A pilot or navigator must mentally interpret these readings with reference to an approach chart or the like in order to obtain a mental visualization of the location of his aircraft relative to reference points depicted on the chart. This mental process is time consuming and subject to error. An automatic pictorial presentation of the relationship of the aircraft to its ground position on the chart eases the task of the pilot and contributes to air safety.

Some modern fighter aircraft have CRT displays which shows the aircraft above a chart image produced in the CRT; however, the pilot has no way of knowing if the information on such displays is accurate, and if the display fails, the chart disappears leaving the pilot "blind." Further, such devices are prohibitively expensive.

When an aircraft is flying in clouds (blind) under Instrument Flight Rules there is a continuous need for a quick and reliable positional fix of an aircraft relative to ground elevations, airports, navigational aids, etc., shown on charts. Air traffic control procedures in the vicinity of airports often require a pilot to follow radio instructions from a distant air traffic controller situated on the ground. The controller monitors the location and movement of an aircraft by radar, plus signals from a transponder on the aircraft and vectors the aircraft. During such radar vectoring, a controller often requests numerous turns and changes of altitude of the aircraft to meet traffic conditions, weather conditions, ground elevations, etc.

A frequent result of such vectoring, during approach (or departure) control, is that the pilot loses a clear perception of the location of the aircraft relative to its ground position and becomes more or less dependent on the instructions from the controller. Such dependency is a source of discomfort among pilots because a controller's equipment can sometimes fail to fix the location of the aircraft accurately and controllers also make mistakes. Thus, pilots need an instrument for visually showing the location of the aircraft relative to the airport, terrain, and obstacles during a radar vectoring. With such an instrument, a pilot is able to detect possible errors in the controller's instructions and to take such action that the situation might require of a pilot-in-command to meet his legal responsibility of a safe flight. Such an instrument provides assurance to the pilot by providing a visual display of the position of the aircraft over the terrain relative to a chart information.

Problems arising from the form of data presentation now provided by conventional aircraft instruments are not confined to landings and take offs under instrument flight rules. Avoidance of hills, mountains, vertical structures or other obstacles prior to the approach control phase is often dependent on radar vectoring by an air traffic controller because of fog, clouds or darkness. Crashes into terrain or vertical obstacles occur with an alarming frequency while aircraft are being vectored, usually with fatal results. A convenient and reliable instrument for independent displaying the relationship of the aircraft to such obstacles for the pilot can forestall such crashes in most cases.

Pilots operating under visual flight rules [VFR] can also benefit from a device displaying their aircraft's location and direction in reference to charts. For example, pilots flying near, under, above or within Terminal Control Areas which have a complex pattern of layered zones for different types of aircraft also need accurate visual information as to their location within or about such zones. Safe navigation in such areas requires a continuous awareness of the location and direction of the aircraft relative to both the horizontal and vertical boundaries of such controlled zones.

The present invention is directed to providing the above advantages and overcoming more than one of the problems discussed above.

SUMMARY OF THE INVENTION

This invention provides an aircraft instrument for displaying the location and direction of travel of an aircraft to an operator in the form of a changing visible image superimposed above a conventional map or chart that depicts predetermined ground locations by using electrical signals which normally define the location of the aircraft relative to a fixed external reference point and employing these signals to create the image above the chart in a position which represents the aircraft's position thereon. The device includes a chart receiver for receiving a selected chart for viewing by the pilot and has image generating means for superimposing a visible image above the chart which represents the aircraft. Image position control means change the location of the image above the chart in response to changes in the electrical signals from the external reference and maintains the image at successive chart locations corresponding to the successive real locations of the aircraft over the terrain depicted on the chart.

In a preferred form of the invention, the visible image has an outline resembling an aircraft and the image position control means orients the image relative to true North depicted on the chart in response to signals from the directional gyro of the aircraft giving actual heading of the aircraft relative to the chart's coordinates.

In another aspect of the invention, the chart compartment has an interior chamber in which the selected chart is inserted and the image generating means includes a transparent liquid crystal display forming part of a transparent window above the chart compartment through which a chart may be viewed at all times, with the visual image being generated in the liquid crystal display. In the preferred form, the chart compartment includes a light source and projection means for directing light between the liquid crystal display [LCD] and the top surface of the chart so that the chart is frontlighted and the LCD is backlighted, thus making use of the 2-sided, non-translucent charts possible, e.g., Jeppesen charts.

In another aspect of the invention, the image position control means includes a computer programmed to continually compute the location of the visual image from the electrical signals produced by the aircraft instruments and to control the image generating means to position a visual image above successive chart locations that correspond to the successive computed locations of the aircraft over the chart.

The aircraft position and direction instrument may also include means for superimposing an additional visual image on the chart that outlines a particular area on the chart and provides a visual indication of the entry of the real aircraft into that area over the ground.

In a further aspect, the invention is directed to an aircraft position and direction instrument for pictorially displaying the location of an aircraft in the context of a chart when the aircraft is equipped with navigation instruments producing electrical signals indicative of the location of the aircraft relative to facilities, such as VOR/DME or Loran radio on the ground or satellites in earth orbit (GPS) or an inertial guidance system and of the heading of the aircraft. The instrument includes a chart receiver housing having a compartment for receiving a conventional chart that depicts predetermined ground locations in the region over which the aircraft is flying. It has a transparent window through which the chart may be viewed at all times and this window is formed, in part, by a liquid crystal display. Means are provided for causing the liquid crystal display to exhibit a visual representation of an aircraft in the display. A computer within the instrument receives signals from the aircraft's navigation instruments and has means for causing the visual representation to move to successive locations over the chart that correspond to the successive actual locations of the real aircraft over the ground. It also includes means for changing the orientation of the visual representation above the chart to correspond to changes of the heading of the aircraft in reference to the chart's coordinates.

Thus, the instrument provides a visual depiction of the location of an aircraft over a chart such as an approach chart, radar video chart, terminal control area chart or the like and in the preferred form displays the heading of the aircraft as well. A pilot may thus continuously view the location and movement of the aircraft over the chart during approach control procedures or other radar vectoring procedures in reference to the chart information. The invention also locates the aircraft relative to hills, mountains and other dangerous obstructions shown on the chart, allowing the pilot to make any necessary flight-safety changes immediately from a glance at the instrument. The ability to view the position of the aircraft position on a chart pictorially provides guidance to the pilot and contributes substantially to air safety. In a preferred form, the invention is embodied in a small, flat tablet sized unit which can be carried in a flight case or briefcase when not in use. It is simply connected to the outputs of the pre-existing instruments of an aircraft when it is utilized by a simple plug connection.

BRIEF DESCRIPTION OF THE DRAWINGS

FIG. 1 is in part a perspective of the instrument embodying the invention, and in part, a schematic diagram of pre-existing instruments found on most aircraft which produce electrical signals that may be used for the operation of the invention.

FIG. 2 is a cross-section of the aircraft position and direction instrument of FIG. 1 taken along line 2—2 thereof.

FIG. 3 is a perspective showing the chart holding mechanism.

FIG. 4 is a fragmentary perspective of a liquid crystal display component of the instrument of the preceding figures.

FIG. 5 is a circuit diagram of electrical and data processing components of the aircraft position and direction instrument of FIG. 1 through FIG. 4.

FIG. 6 is a front view of the instrument illustrating usage with a radar video chart during radar vectoring operations prior to entering the approach chart phase of the flight.

DETAILED DESCRIPTION OF THE PREFERRED EMBODIMENT

With reference to FIG. 1 of the drawings, the aircraft position and direction instrument 11 of this particular embodiment of the invention has a housing 12 for receiving a conventional approach chart 13 that depicts predetermined ground locations in the region over which the aircraft is or will be flying. Housing 12 is preferably about the size of a small writing tablet, having a thin flat rectangular shape. This size makes it convenient to carry the instrument 11 in a flight case and to use the instrument in the crowded environment of an aircraft cockpit. The compact instrument 11 may, for example, be placed on the lap of a pilot or be strapped to the pilot's knee.

A slot 14 with rounded edges extends along one side of housing 12 to enable insertion of the chart 13 into a thin interior chart compartment 16 situated between the housing floor 17 and a slightly spaced apart transparent window assembly 18 which overlays the compartment. The window assembly allows direct viewing of the inserted chart at all times. The chart compartment has a rectangular configuration conforming footprint of the maps or charts 13 to be employed and extends from slot 14 to an interior wall 19 within the housing. Housing end walls 21 and 22 form the ends of this compartment.

Correct and consistent positioning of chart 13 is facilitated by first abutting the edge of the west region of the chart against interior wall 19 and the edge of the north region of the chart against end wall 21. The chart 13 is held in place at its position during use by a chart hold clip 23 which is located adjacent to interior wall 19 in floor 17.

Referring to FIGS. 2 and 3, the chart hold clip 23 is c-shaped having a flat foot 24 positioned in an opening 25 in the floor 17 of the housing. A shank 26 connects the foot with a button 27 and the clip is spring loaded by spring so the foot engages the top side 43 of the chart compartment 16 under the drive of the spring. The operator temporarily depresses button 27 while inserting or removing a chart 13. This action separates the foot 24 from the top side of the chart compartment so a chart can pass over the foot. Finger openings 28 in floor 17 facilitate location, insertion and removal of the chart 13 and button 27 is released when the chart is positioned allowing the spring to drive the clip 23 so its foot clamps the chart against the top surface of the compartment 16.

Since the Vx-Hy grid is fixed within the liquid crystal display and the visual image moves about within the grid, it is necessary for the pilot to align the chart 13 with the grid at the time of insertion, such as by squaring the left edge and top edge of the chart frame with the left and top reference lines of the grid then securing the chart so it will not move after its proper orientation. The "squaring" would not be necessary if the chart frames, both obverse and reverse, were always printed in the same position on the paper, but in the cartographer's printing and cutting process significant edge tolerances are allowed. However, the pilot unknowingly compensates for these tolerances when he inserts and aligns the chart frame with the grid reference as indicated.

The chart 13 is slipped into the bevelled slot 14 in the edge of the housing immediately below the light wedge glass and adjusted while the "MAP HOLD" button 27 is depressed; upon its release the chart is captured and held.

Because the chart slot 14 (except for its easy-insert bevelled edges) is thin—just enough width to accept the thickness of the paper chart—finger-access is provided through openings 28 in the floor 17 of the instrument for easy chart positioning and retrieval.

Referring again to FIG. 1, the pilot of an aircraft may refer to the inserted map or chart 13 in the conventional manner as it is always visible through window assembly 18. The instrument 11 acts to superimpose a visible image 29 above the chart which image is representative of the aircraft's position over the chart being employed. A computer maintains the image at locations above the chart corresponding to the real time locations of the aircraft over the region depicted on the chart. In the present preferred form of the invention, the image 29 has an outline of an aircraft and the instrument 11 further orients the aircraft image over the chart relative to the real aircraft heading. This gives an instant visual indication of the direction of movement of the real aircraft in reference to the chart's display in addition to the instantaneous location of the aircraft on the chart.

To improve visibility, the aircraft image is substantially larger than it would appear using the scale of chart 13. Thus, one particular point in the image 29, the nose 31 of the aircraft image in this case, represents the actual location of the real aircraft over the chart 13. The aircraft image 29 may be flashed on and off in a cyclical manner to make its location more noticeable to the pilot.

The aircraft image 29 is generated in a liquid crystal display 32. In particular, with reference again to FIGS. 1 and 2, the upper layer of window assembly 18 is a thin, flat rectangular sheet 33 of liquid crystal. Referring to FIG. 4, the liquid crystal sheet 33 is of the known type having a first grid of parallel conductors 34 on or near one face and an orthogonally oriented spaced apart second grid of parallel conductors 36 on or near the other face. As is understood in the art, a visible point or pixel can be produced at a particular location in the crystal 33 by creating an electrical voltage difference between a particular one of conductors 34 and a particular one of conductors 36 that cross each other at that location of the crystal. Thus, an image is produced by applying voltages across appropriate conductors 34 and 36 and the image can be moved by changing the particular conductors which are energized. Control of the liquid crystal display 32 to generate the aircraft image will be discussed later in this specification.

Referring again to FIGS. 2 and 3, the window assembly 18 also includes a transparent plate 37 of plastic or glass situated between liquid crystal 33 and chart compartment 16. The face of the chart 13 in compartment 16 is illuminated, to facilitate viewing, by a linear light source 38 or a series of side-by-side light sources, such as lamps with reflectors, or fiber optics disposed in a recess 39 in housing wall 19 which directs light into the adjacent edge 41 of the transparent plate 37. Illumination of all regions of the chart 13 is promoted in that the plate 37 has a wedge shape, with the top surface 42 of the plate being sloped so it becomes increasingly closer to compartment 16 as it extends away from the light source 38 while the lower surface 43 of the plate is parallel to the floor 17 of the compartment. Thus, light which initially intercepts the top surface 42 of the plate 37 at or within the angle of total internal reflection is reflected towards the face of chart 13 which is remote from the light source 38. Owing to the slope of top surface 42, such light may be incident on the lower surface at a greater angle and be refracted down toward chart 13 rather than being again reflected. This light source illuminates the chart when there is no ambient light and also backlights the liquid crystal display 32.

Referring to FIG. 1, the data needed to control the location, and orientation of the aircraft image 29 relative to chart 13 is obtained from the aircraft's navigation instruments 44 that are of known construction and which are already installed in most aircraft. These typically include a visual omni range (VOR) radio receiver 46, distance measuring equipment (DME) 47 and a directional gyro (DG) 48 which instruments also provide outputs for the automatic pilot system.

At this juncture, it is to be appreciated that the invention is not limited to input signals from DG, VOR and DME equipment. Indeed, the invention can operate with Loran equipment and/or satellites in earth orbits (GPS) and/or inertial guidance systems. Thus, the description using DG, VOR and DME equipment is only by way of illustration as opposed to a limitation. Persons skilled in the art will recognize the application of the following description to the other signal sources mentioned.

The omni range receiver 46 produces a signal in the form of a D.C. electrical voltage which corresponds to the angular position of the aircraft relative to a selected ground based radio facility (VORTAC or VOR/DME, for example) which are maintained for facilitating aerial navigation. The signal controls a course deviation indicator (CDI) dial 49 on the aircraft instrument panel. Such receivers 46 produce another signal which indicates whether the selected radial points to or away from the selected radio facility and generates still another signal which indicates if the received signals are too weak to be reliable. Distance measuring equipment (DME) 47 produces yet another electrical signal that identifies the distance of the aircraft from the selected ground based radio facility and registers on a numerical display 51 on the instrument panel. Directional gyro (DG) 48 produces still another signal which identifies the heading of the aircraft and which registers on another instrument panel indicator 52.

As is understood in the art, the data generated by the omni range receiver 46 and distance measuring equipment 47 enable a computation of the position of the aircraft relative to the selected ground based radio facility (53 in FIG. 1) illustrated on the approach chart 13 or radar video charts and the like. The novel instrument 11 of the present invention includes a small computer 54 [such as a TI programmable calculator] which continually calculates the location of the aircraft from the VOR and DME signals and converts it to an instantaneous chart location. Its output controls the liquid crystal display 32 to maintain the nose pixel 31 of the aircraft image 29 over the chart location which correspond to the actual location of the real aircraft relative to its position over the ground as shown on the chart 13.

Computer 54 is programmed in a manner hereafter discussed, and responds to the signals from directional gyro 48 by maintaining the actual heading (True Heading) or angular orientation of aircraft image 29 relative to the chart's "North" orientation which may, or may not, match the True Course track of the aircraft, as the heading may include a "crab" due to wind conditions, etc. As an option, by retaining previously displayed nose positions on the display 32 as a series of dots the track of the aircraft across the chart will be displayed visually.

The above described signals from omni range receiver 46, distance measuring equipment 47 and directional gyro 48 are transmitted to housing 12 through a multi-conductor electrical cable 56 which extends from the housing to the aircraft and is plugged into an electrical plug on the aircraft instrument panel. Many aircraft are already equipped with such an adaptor or electrical plug for providing the signals from instruments 44 to auxiliary equipment such as an autopilot. An additional connector 57 can easily be installed for the present invention which is totally passive to the signals from these instruments.

Connector 57 and cable 56 also provide positive and negative operating voltages from the D.C. power supply 58 of the aircraft and an aircraft chassis ground for the instrument 11 although the instrument can be modified to operate from an internal battery as a back-up power supply.

An entry keyboard 59 is provided along one edge of the instrument 11 for entry of data which is needed to initiate its operation for a specific flight. The keyboard 59 extends along the left side of the upper surface of housing 12 in this particular example although other configurations are also possible.

Referring to FIG. 5, the computer 54 of this particular embodiment of the invention is a TI-66 programmable calculator manufactured by Texas Instruments of Dallas, Tex., with a modified keyboard although other types of small computers or microprocessors may also be utilized as well as a custom chip designed specifically for this instrument. Computer 54 receives the output signals from omni range receiver 46, distance measuring equipment 47 and directional gyro 48 through a data bus 61 from analog to digital signal converters 62, 63 and 64 respectively which convert the analog signal voltages to continuing sequences of digital signal bytes each of which is indicative of the momentary magnitude and polarity of the analog signal which it represents. Computer 54 also receives operator entered control signals and initializing data entries from keyboard 59 via the input data bus 61, such signals and entries being of binary digital form in this example. It can be appreciated that other navigational inputs (such as GPS or Loran) could be used in place of the VOR and DME signals.

The liquid crystal display 32 in which the visual image 29 is generated may be of the known design which produces an image that shifts between successive locations in response to digital control signals which are generated by computer 54 and transmitted to the display on an output data bus 66.

A program listing, in machine code language, enabling the computer 54 to perform the herein described operations for DG, VOR and DME signals is set forth toward the end of this specification.

The keyboard 59 of the instrument include a series of finger pressure operated switches 67 of the known type used on calculators for generating digital signals which identify entered numbers or operations to be performed. These signals are transmitted to computer 54 via input data bus 61. The series of switches 67 include an "On" switch 68, a group of digit switches 71 for entering any of the digits 0 to 9 or a decimal point and another group of function switches 72 for initiating arithmetical calculations, such as addition, substraction, multiplication and division. "On" switch 68 also serves as a clear entry switch if operated while the instrument 11 is already activated. The unit stays activated once it is turned on.

Function switches 72 which enable use of the instrument 11 as an ordinary calculator are provided in this embodiment as a convenience to the pilot but are not essential for the purposes of displaying aircraft position and direction on liquid crystal display 32. The results of such calculations can appear in liquid crystal display 32, if desired, as can the "prompts" of the instrument.

Operation of the instrument 11 is begun by tuning the aircraft's navigation radio to the nearest TAC or other appropriate reference facility that transmits radio signals for fixing the position of the aircraft. "On" switch 68 is then actuated to apply operating voltage to computer 54 and the other electrical components of the instrument, including the chart illumination light source 38. Referring to FIG. 1, the chart 13, which is appropriate for the desired stage of the flight, is then inserted into compartment 16 and is secured in place by the chart hold clip 23 in the manner which has been described. Depending on the circumstances and stage of the flight, the chart 13 may be an approach chart, a radar video chart or any other to-scale map-like representation of predetermined ground locations over which the aircraft is being flown.

Referring again to FIG. 5, the program causes computer 54 to respond to actuation of the "On" switch 68 by presenting the first of a series of visible prompts at LCD window 73 [or alternatively in the display 32], which advises the operator of data which is to be manually entered to initialize the instrument 11 for a particular situation. The first such prompt reads "CHART." The operator then actuates the appropriate one of four switches 77, 78, 79 or 81 to transmit a signal to the computer 54 that identifies the particular type of chart 13 to be used. Switches 77, 78 and 79 respectively identify the chart 13 as a minimum vectoring altitude (Radar Video) chart, an airport approach chart or a terminal control area chart. The scale of such commercial charts or maps is standardized and stored in the computer 54 memory. The additional switch 81, marked "Scale," is used when the chart 13 is not one of the standardized types where the operator then enters the scale of the non-standard chart 13 using the number entry digit switches or keys 71.

The computer 54 automatically displays a second prompt at window 73 that reads "VARIATION." Using the digit keys 71, the operator then enters the magnetic compass variation for the location of the area of the chart and, except where the variation is zero, actuates the appropriate one of two switches 82 to identify the variation as being east or west of true north or "zero" switch 83 if there is no variation. This enables the computer 54 to convert magnetic compass headings from the DG 48 to the true bearings shown on the chart 13.

In accordance with the program, the next prompt from memory is displayed in window 73 which third prompt reads "DOT OVER." Keyboard 59 has an additional four switches 84, 86, 87 and 88 for transmitting signals to computer 54 that, as provided in the program, to manually shift the position of a flashing dot over the surface of chart 13. In particular, switches 84, 86, 87 and 88 respectively move the flashing dot in the display left, right, up and down on the chart. Although not essential, it is convenient if the switches 84, 86, 87 and 88 are arranged together in a pattern corresponding to the directions of "dot" movement produced by the switches as disclosed in the drawings.

In most instances, the VORTAC, VOR/DME or other ground radio facility to which the aircraft navigation radio has been tuned is within the area depicted by chart 13 and is shown on the chart by a standard symbol 53. In response to the "DOT OVER" prompt at window 73, the operator uses one or more of the switches 84, 86, 87 and 88 to position a flashing dot over the ground radio facility symbol 53 on the chart 13. An additional keyboard TAC switch 89 is then actuated to generate and transmit a signal to computer 54 that the flashing dot has been positioned over the fix in the above described manner.

The program then causes the computer 54 to create a visual image 29 radially outward from facility 53 which corresponds, on the scale of chart 13, to the distance of the real aircraft chart position from the ground radio facility as detected by DME 47.

Thus, these operations situate the visual image 29 at a location on chart 13 corresponding to the actual location of the real aircraft relative to the ground data shown on the chart and at an angular orientation relative to the chart that corresponds to the heading of the real aircraft relative to the ground. Thereafter, while the instrument 11 remains in operation, the program directs computer 54 to continually re-plot the location and angular orientation of the image relative to the chart 13 by monitoring changes in the VOR 46, DME 47 and DG 48 signals and converting the data to re-position the visual image 29 relative to chart 13 to maintain correspondence with the actual position of the real aircraft over the ground.

In some instances, the ground radio facility is outside of the area depicted on chart 13 and thus the chart location of that facility cannot be entered into computer 54 simply by manual positioning of the flashing dot over a chart symbol 53 as described above. With this condition, the operator responds to the "DOT OVER" prompt by using one or more of the positioning switches 84, 86, 87 and 88 to locate the flashing dot over a point (fix) that is depicted on the chart and for which the omni bearing (which always includes the variation that must be corrected if other than zero) and distance to the ground radio facility are obtainable from the chart 13, or tables. A "D-fix" switch 91 is then actuated, rather than the TAC switch 89, to condition computer 54 to compute and store the location of the ground facility with respect to the chart 13. To enable this computation, the operator then enters the distance of the ground radio facility from the selected point on chart 13, in nautical miles in this case, with the digit entry switches 71 and actuates an "NM" switch 92 to enter this data into computer 54. The program then causes computer 54 to initiate a final prompt in window 73 as "RADIAL." The operator responds by entering the compass bearing, in degrees, of the ground radio facility location relative to the selected chart "fix" with digit switches 71 and then actuates the degree switch 93 to enter the data.

The program then causes computer 54 to respond by computing and storing the location at which the ground radio facility would appear on chart 13 if the chart were extended to include its location. The computer 54 then generates signals which locates the visual image 29 relative to chart 13 in the manner previously described to maintain the image over a chart location and orientation corresponding to the situation of the real aircraft relative to the ground.

It is also possible to dispense with manual entry of some of the data as described above by encoding the chart 13 with bar codes and equipping the instrument with a bar code reader or the like located to sense the data when the chart is inserted into the instrument. This can be done in the case of those particular entries, such as type of chart, scale, magnetic variation, runway number, etc., that are the same any time that the particular chart is used.

The particular chart 13 depicted in FIG. 1 is an approach chart such as is used during the approach to an airport, typically from a distance of about 25 to 50 miles out. FIG. 6 depicts use of instrument 11 with another type of chart 99 which is a radar video chart used by Air Traffic Control showing minimum vectoring altitudes that must be maintained in the depicted geographical area to avoid vertical obstacles. After data entries are made for the appropriate type of chart, the instrument 11 operates as previously described to create a visual representation 29 of an aircraft over the chart which moves in accordance with the actual position of the real aircraft. Thus, the pilot can ascertain at a glance if air traffic control instructions route the aircraft into terrain or other hazards depicted on the chart.

Radar video charts 99 typically cover a large geographical area and have a different scale than the more detailed approach charts used during the final phases of a flight. Instrument 11 includes a further feature which immediately alerts the pilot when it is time to change to the approach chart when using such Radar video charts. In particular, with reference to FIGS. 5 and 6, actuation of another keyboard switch 100 conditions computer 54 to generate another visible image 101 in liquid crystal display 32 which is a rectangular frame outline having the shape of an approach chart and which is proportioned to outline a ground area on chart 99 that corresponds to the area shown on the approach chart. The computer program positions the frame image 101 so that it corresponds to the actual ground area shown on the particular approach chart which is to be used (as previously entered and stored). The relationship between the visual image 29 and fixed frame image 101 make it immediately evident to the pilot when the aircraft is entering the region shown on the approach chart.

The liquid crystal display 32 is preferably of the known type. It can produce flashing images having a cyclically varied intensities if desired to make it easier to recognize the images 29 and 101 at a glance.

Referring again to FIG. 1, the charts 13 such as approach charts are provided with symbolic depictions 102 of hills, mountains (some more recent charts actually include contour lines), tall structures or other hazards which are accompanied by notations giving the elevations of such hazards. The instrument 11 enables a pilot flying blind under instrument flight rules in Instrument Meteorological Conditions (IMC) to monitor the position of the aircraft relative to such vertical obstacles and, with an altimeter check, to challenge an air traffic controller's instructions, if necessary.

The instrument 11 has been herein described as operating from radio signals originating at a VORTAC or VOR/DME type of navigational radio facility. The following computer program enables the instrument 11 to accept such signals, but ground LORAN, orbiting GPS or an inertial guidance system signals can easily be adapted to operate the instrument.

A program for VOR and DME signals enabling the computer 54 to respond to keyboard 67 and to control liquid crystal displays 32 and 73 to accomplish the described operations is as follows:

PROGRAM LISTING
▶ = PROMPT (Display)
◀ = STROBE
▼ = AUTO-FEED
" = exchange
± = plus or minus
Merlaticator = meridian-latitude indicator

| Step | Function | Reason |
|---|---|---|
|  | RST | Power-up |
| 000 | CLR | To clear any uncompleted calculations. |
| 001 | RCL | To recall and display contents of. |
| 002 | PM-1 | Prompt Memory 1 |
| 003 | R/S | ▶1. CHART (display) Await pilot-entry of map type (MVA; APPR; TCA; or digits and SCALE) |
| 004 | LBL |  |
| 005 | A | MVA (key) 25 NM/inch |
| 006 | 4 | Pixels |
| 007 | STO | Store in |
| 008 | 00 | Memory 00 |
| 009 | F | Jump to Label F (Variation) |
| 010 | LBL |  |
| 011 | B | APPR (key) |
| 012 | 2 | Pixels |
| 013 | 0 |  |
| 014 | STO | Store in |
| 015 | 00 | Memory 00 |
| 016 | F | Jump to Label F (Variation) |
| 017 | LBL |  |
| 018 | C | TCA (key) |
| 019 | NOP | (reserved) |
| 020 | 1 | Pixels |
| 021 | 0 |  |
| 022 | STO | Store in |
| 023 | 00 | Memory 00 |
| 024 | F | Jump to Label F (Variation) |
| 025 | LBL |  |
| 026 | D | Keyboard-enter digits of map scale, then press SCALE (key) |
| 027 | STO | Store map scale in NM/inch in |
| 028 | 06 | Memory 06 |
| 029 | 1 | Pixels |
| 030 | 0 | Per |
| 031 | 0 | Inch |
| 032 | ÷ | Divided by |
| 033 | RCL | Map |
| 034 | 06 | Scale |
| 035 | = | Pixels |
| 036 | STO | Store in |
| 037 | 00 | Memory 00 |
| 038 | F | Jump to Label F (Variation) |
| 039 | LBL |  |
| 040 | F |  |
| 041 | RCL | To recall and display contents |

-continued

PROGRAM LISTING
▶ = PROMPT (Display)
◀ = STROBE
▼ = AUTO-FEED
" = exchange
± = plus or minus
Merlaticator = meridian-latitude indicator

| Step | Function | Reason |
|---|---|---|
|  |  | of |
| 042 | PM-2 | Prompt Memory 2 |
| 043 | R/S | ▶2. VARIATION (display) Await pilot-entry of variation digits. Pressing "0" at this point, "E" or "W" (−) causes entry. |
| 044 | STO | Variation. "East" is positive; "West" enters negative sign; "0" enters "no variation" (agonic line) |
| 045 | 01 | in Memory 01 |
| 046 | RCL | To recall and display contents of |
| 047 | PM-3 | Prompt Memory 3 |
| 048 | R/S | ▶3. PSN DOT (display) After positioning Dot pressing TAC or D-Fix causes entry of Hy-Vx coordinates of dot over TAC or D-Fix in pixels. |
| 049 | E | If TAC is pressed the program jumps to Label E; if D-Fix is pressed the program cycles on at 050. |
| 050 | AE | Auto-enter Hy pixels (3 digits) |
| 051 | ÷ | Divided by |
| 052 | RCL | Map scale |
| 053 | 00 | In pixels |
| 054 | = | Which equals |
| 055 | STO | Temporary |
| 056 | 04 | Hy northwest corner |
| 057 | AE | Auto-enter VX pixels (3 digits) |
| 058 | ÷ | Divided by |
| 059 | RCL | Map scale |
| 060 | 00 | In pixels |
| 061 | = | Which equals |
| 062 | +/− | (reverse corrected) on chart |
| 063 | STO | Temporary |
| 064 | 05 | Vx northwest corner |
| 065 | RCL | To recall and display contents of |
| 066 | PM-4 | Prompt Memory 4 |
| 067 | R/S | ▶4. DISTANCE (display) Await pilot-entry of D (DME) digits shown on chart. Pressing MILES enters the Distance. |
| 068 | xwt | To enter Distance in t-register and prepare for Polar-Rectangular conversion. |
| 069 | RCL | To recall and display contents of |
| 070 | PM-5 | Prompt Memory 5 |
| 071 | R/S | ▶5. RADIAL (display) Await pilot-entry of Radial digits shown on chart. Pressing DEGREES enters the Radial. |
| 072 | LBL |  |
| 073 | G | To correct Radial |
| 074 | + | Radial plus |
| 075 | RCL | Recall |
| 076 | 01 | Variation. To convert from Magnetic to True North reference |
| 077 | + | To reverse Radial |
| 078 | 1 | To determine bearing |
| 079 | 8 | Of station |
| 080 | 0 | From fix |
| 081 | = | Equals the bearing to the station as related to True North. |
| 082 | P→R | Makes the Polar-to-Rectangular conversion |
| 083 | STO | Store HY of northwest corner |
| 084 | 02 | in Memory 02. |

-continued

PROGRAM LISTING
▶ = PROMPT (Display)
◀ = STROBE
▼ = AUTO-FEED
" = exchange
± = plus or minus
Merlaticator = meridian-latitude indicator

| Step | Function | Reason |
|------|----------|--------|
| 085 | x"t | Recall Vx |
| 086 | STO | and store Vx northwest corner |
| 087 | 03 | in Memory 03. |
| 088 | RCL | Recall |
| 089 | ·02 | Hy northwest corner |
| 090 | + | and add |
| 091 | RCL | to the previous |
| 092 | 04 | temporary Hy northwest corner |
| 093 | = | equals |
| 094 | +/− | Change sign |
| 095 | STO | To store |
| 096 | 02 | Memory 02 + Memory 04 Hy northwest corner in Memory 02. |
| 097 | RCL | Recall |
| 098 | 03 | Vx northwest corner |
| 099 | + | plus |
| 100 | RCL | Recall |
| 101 | 05 | temporary Vx northwest corner |
| 102 | = | equals |
| 103 | +/− | Change sign |
| 104 | STO | To store |
| 105 | 03 | Memory 03 + Memory 05 Vx northwest corner in Memory 03 |
| 106 | H | Cartography complete. Couple navigation equipment and jump to Label H |
| 107 | LBL | |
| 108 | E | (See step 049 - TAC entry) |
| 109 | AE | Auto-enter Hy pixels (3 digits) |
| 110 | ÷ | divided by |
| 111 | RCL | map scale |
| 112 | 00 | in pixels |
| 113 | = | which equals |
| 114 | STO | temporary |
| 115 | 04 | Hy northwest corner |
| 116 | AE | Auto-enter Vx pixels (3 digits) |
| 117 | ÷ | divided by |
| 118 | RCL | map scale |
| 119 | 00 | in pixels |
| 120 | = | which equals |
| 121 | +/− | (reverse corrected) |
| 122 | STO | temporary |
| 123 | 05 | Vx northwest corner in miles |
| 124 | 0 | To "zero" x and t registers and |
| 125 | x"t | skip "Distance" and "Radial" |
| 126 | 0 | |
| 127 | G | Return to LBL G (at 072) to start Polar-Rectangular conversion |
| 128 | LBL | To start navigation computations and provide |
| 129 | H | Feeds to Merlaticator (LCD) |
| 130 | STR | Strobe DME for |
| 131 | DME | ◀6 Distance and |
| 132 | x"t | place radius in t-register |
| 133 | STR | Strobe VOR |
| 134 | RAD | ◀7 Radial |
| 135 | + | and add |
| 136 | RCL | |
| 137 | 01 | Variation |
| 138 | = | True North. |
| 139 | P→R | Make Polar-Rectangular Conversion and |
| 140 | STO | store |
| 141 | 04 | AC Hy position |
| 142 | x"t | Recall t-register |
| 143 | STO | and store |
| 144 | 05 | AC Vx position |
| 145 | STR | Strobe |
| 146 | DG | ◀8 DG heading |
| 147 | + | plus |
| 148 | RCL | |
| 149 | 01 | Variation |
| 150 | = | True Heading |
| 151 | AF | Auto-feed DG (corrected) -- TC±WCA |
| 152 | TH | ▼9 True Heading to Merlaticator (LCD) |
| 153 | RCL | Recall |
| 154 | 02 | Map northwest Hy |
| 155 | − | minus |
| 156 | RCL | Recall |
| 157 | 04 | AC Hy position |
| 158 | = | |
| 159 | × | multiplied |
| 160 | RCL | by |
| 161 | 00 | pixels |
| 162 | = | AC Hy position (−) |
| 163 | +/− | to change to positive value |
| 164 | AF | Auto-feed |
| 165 | HyP | ▼10 AC Hy position to Merlaticator (LCD) |
| 166 | RCL | Recall |
| 167 | 03 | map northwest Vx |
| 168 | − | minus |
| 169 | RC | Recall |
| 170 | 05 | AC Vx position |
| 171 | = | |
| 172 | × | multiplied |
| 173 | RCL | Recall |
| 174 | 00 | pixels |
| 175 | = | AC Vx position |
| 176 | AF | Auto-feed |
| 177 | V×P | ▼11 AC Vx position to Merlaticator (LCD) |
| 178 | H | Return to DME Strobe 6 to commence recycle and up-date of AC position and heading |

End Program Listing

This is a minimum program listing to illustrate the invention and will be enhanced in the commercial instrument.

To increase the utility of the instrument, the program can be enlarged to include "prompts" for electronic "check lists" for take-offs, landings, shut down, emergency procedures, etc.

While the invention has been described with regard to one particular preferred embodiment for purposes of example, it should be recognized that many modifications and variations of its construction are possible. The description is not intended to limit the invention.

Although the foregoing descriptive material deals with aerial navigation, the same principles are applicable to water navigation (pleasure boats, yachts, ships) and land navigation (automobiles and other ground vehicles) especially with regard to Loran and GPS. GPS positioning is now accurate to within about 50 feet, laterally and vertically (the width of a 4-lane street or the height of a 5-story building.

For automobile navigation it may be a boon to car-rental companies (who furnish local printed charts to their customers) since rental cars are usually driven by non-residents unfamiliar with the locale and its environs.

Approach charts also provide visual glide slope information and it should be appreciated that the novel instrument can, with an appropriate input for altitude, provide an image on the glide slope profile which corresponds to the aircraft's altitude and distance from the runway. This is another visual display which aids in navigation in adverse flight conditions.

Having described my invention, I claim:

1. A navigational instrument capable of displaying its position over a chart, including 2-sided charts, which corresponds to the instantaneous position of the instrument over ground depicted on the chart comprising:

a housing unit having a compartment means for holding a printed chart and a window means through which said chart in said compartment means can be viewed at all times;

a transparent liquid crystal display means incorporated in said window means operable to generate an image in said window means in response to electrical signals;

a light source means associated with said window means having a transparent plate disposed between said liquid crystal display means and said compartment means with a light source positioned to direct light into an edge of said plate so it is operable to illuminate said compartment means so said chart therein is frontlighted and said liquid crystal display means is backlighted; and, a computer means connected to said liquid crystal display and also connected to a source of signals for said instrument's bearing and distance to at least one known ground location depicted on said chart in said compartment means, said computer means operable to convert said signals to data for generating a visible image in said liquid crystal display means above the chart which represents the instantaneous position of said instrument on said chart corresponding to its actual position over ground as depicted in said chart.

2. The instrument defined in claim 1 wherein the instrument includes a self-contained Global Positioning System receiver means for receiving satellite signals as a source of signals to accurately locate said instrument in reference to its current location in reference to terrain over which it is used.

3. The instrument defined in claim 1 wherein the instrument includes a self-contained loran receiver means for receiving loran signals as a source of signals to accurately locate said instrument in reference to its current location in reference to terrain over which it is used.

4. A vehicle instrument for displaying the location of a vehicle to a vehicle operator in the form of a visible image superimposed over a chart that depicts predetermined ground locations, said vehicle having at least one instrument which produces electrical signals which define the location of the vehicle's position relative to an external reference point, comprising:

a chart receiver for receiving and securing a selected chart for viewing by the vehicle operator;

a window means overlying said chart receiver through which a chart in said chart receiver can be viewed at all times, said window means including image generating means having a transparent liquid crystal display means overlaying said chart compartment enabling viewing there through such selected chart, while a visible image is generated in said liquid crystal display means above such chart, said window means also including a light source within the window means having a transparent plate disposed between said liquid crystal display and said compartment with a light positioned to direct light into an edge of said transparent plate so it is operable to illuminate a chart in such chart receiver and backlight said liquid crystal display means;

said image generating means operable to generate a visible image in said window means over said chart which is representative of said vehicle's position on said chart in said chart receiver; and image position control means for changing the location of said visible image of said image generating means over said chart in response to said electrical signals to maintain such image at successive locations that correspond to the successive real locations of said vehicle over terrain depicted in the chart.

5. The vehicle instrument as defined in claim 4 wherein the vehicle is an aircraft.

6. The vehicle instrument as defined in claim 5 wherein the signals from the vehicle's at least one instrument are from the a direction gyro, an omni and distance measuring equipment on the vehicle.

7. The vehicle instrument as defined in claim 4 wherein said at least one instrument includes a directional gyro means for producing a directional signal indicative of the heading of the vehicle, the image position control means is operable to generate an image in window means which indicates in such image the heading of the vehicle responsive to said directional signal, relative to coordinates of the chart.

8. The vehicle instrument defined in claim 4 wherein said at least one instrument includes a directional gyro means for producing a directional signal indicative of the heading of said vehicle, and wherein said image position control means creates a visual image which has an outline symbolic of said vehicle and changes the orientation of said image relative to said chart in response to changes in said directional signal to maintain its conformity with the actual heading of said vehicle.

9. The vehicle instrument defined in claim 4 further including second image means for causing said image generating means to superimpose an additional visible image over the chart, which additional visible image corresponds to the boundary of a particular area of a chart whereby entry of the vehicle into said boundary will be depicted to the vehicle's operator from an observation of said images.

10. The vehicle instrument defined in claim 4 wherein the chart receiver has an interior compartment into which the chart may be inserted and wherein the window means includes a transparent window overlaying said compartment and through which the inserted chart may be viewed, the visible image being generated in said window means by the image generating means therein.

11. The vehicle instrument defined in claim 10 wherein the image generating means includes a liquid crystal display forming at least a portion of the window means with the visible image being generated in said liquid crystal display by electrical inputs thereto.

12. The vehicle instrument defined in claim 10 wherein the chart receiver has guide means to which inserted charts may be aligned to assure that said chart is always located at a predetermined position within said compartment, and also means for temporarily clamping an inserted chart in said predetermined position.

13. The vehicle instrument defined in claim 4 wherein the chart receiver has a flat interior floor and wherein the transparent plate has an inner surface facing said floor and which is parallel thereto and said transparent plate has an outer surface which tapers to smaller thickness towards the edge of said plate which is remote from the light source and is operable to illuminate the interior of said chart receiver.

14. The vehicle instrument defined in claim 4 wherein the chart receiver is a portable housing having the window means, the image generating means and the image portion control means contained therein, with said housing having a multi-conductor flexible electrical cable extending from said housing with connector means for selectively coupling the instrument to the vehicle's at least one instrument to receive signals therefrom to operate the instrument.

15. The vehicle instrument defined in claim 14 wherein the housing has a substantially flat rectangular configuration and is proportioned in size for disposition on the lap of the vehicle operator.

16. The vehicle instrument defined in claim 4 including circuit means for cyclically varying the intensity of the visible image in the liquid crystal display means.

17. The vehicle instrument defined in claim 4 wherein signals from the vehicle's at least one instrument include a first signal which represents the azimuthal position of the vehicle relative to a fixed external reference point and a second signal which represents the distance of said vehicle from said fixed external reference point and wherein the image position control means includes a computer means operable to repetitively compute the location of said vehicle from changes in said first and second signals and further is operable to cause the image generating means to position the visible image over successive chart locations that correspond to said vehicle's position on terrain depicted on the chart being used.

18. The vehicle instrument defined in claim 17 wherein the signals from the vehicle's at least one instrument include a third signal representing the heading of the vehicle and wherein the visible image has an outline symbolic of said vehicle's directional orientation, and wherein the computer means is operable to change the orientation of said visible image relative to a chart in response to changes in said third signal to maintain said visible image in an orientation corresponding to the current heading of said vehicle in respect to coordinates of the chart in use.

19. The vehicle instrument defined in claim 18 wherein the visible image is of larger size than the actual size of the vehicle in reference to the scale of a chart in use and has a symbolic depiction of the nose of said vehicle with the computer means being operable to maintain said depiction of the nose of said vehicle at the successive chart locations over said chart which correspond to the successive real locations of said vehicle on terrain depicted in said chart.

20. The vehicle instrument defined in claim 18 wherein the housing includes a keyboard means with means for generating and transmitting signals to the computer means that identify magnetic compass variations at the location of the vehicle over ground.

21. The vehicle instrument defined in claim 20 further including means on the keyboard means for manually moving the visible image to a selected chart location that corresponds to the actual location of an external reference point, means for signalling to the image position control means that said visible image has been so positioned whereby said image position control means is operable to reposition said image at a chart location having a proper azimuthal relationship to said fixed external reference point and at a distance corresponding to the actual distance the vehicle is from said reference point adjusted to the scale of the chart.

22. An aircraft instrument for pictorially displaying the instantaneous location and heading of an aircraft having navigation instruments which produce electrical signals indicative of the location of the aircraft relative to a fixed reference and indicative of the heading of the aircraft, comprising;
a chart receiver housing having a chart compartment therein for receiving a chart which depicts predetermined ground locations in the region over which said aircraft is flying and having a transparent window means overlaying said compartment through which said chart may be viewed at all times, said window means being formed at least in part by a transparent liquid crystal display, said window means also including a light source within the window means having a transparent plate between said liquid crystal display and said chart receiver with a light arranged to direct light into an edge of said plate whereby light therefrom is directed to said chart compartment to illuminate chart which are inserted therein and to backlight the liquid crystal display;
circuit means for causing said liquid crystal display to exhibit a visible image representative of the aircraft therein;
conductor means between said aircraft and said housing for transmitting electrical signals from the aircraft instruments to said housing; and,
a computer means disposed within said housing connected to said signals and operable to cause said visible image to move to successive locations over said chart in said liquid crystal display that corresponds to the successive actual locations of said aircraft over the ground depicted on said chart, said electrical signals defining the location of the instrument's position relative to an external reference point, and having means for changing the orientation of said visible image relative to said chart to correspond to changes of the actual heading of said aircraft.

23. An instrument for displaying its location in the form of a visible image superimposed over a chart that depicts predetermined ground locations where the instrument is being used, comprising:
a chart receiver for receiving and securing a selected chart for viewing by the user;
a window means overlaying said chart receiver through which a chart in said chart receiver can be viewed at all times, said window means also including image generating means having a transparent liquid crystal display, and said window means also including a light source within the window means having a transparent plate between said liquid crystal display and said chart receiver with a light arranged to direct light into an edge of said plate so it is operable to illuminate charts which are inserted therein and backlight said image generating means;
said image generating means operable to generate a visible image in said window means over said chart which is representative of said instrument's position on said chart in said chart receiver; and
image position control means for changing the location of said visible image of said image generating means over said chart in response to external electrical signals received by said instrument to maintain said image at successive locations that correspond to the successive real locations of said instrument over terrain depicted in the chart.

* * * * *